(12) United States Patent
Benavides et al.

(10) Patent No.: US 9,764,727 B1
(45) Date of Patent: Sep. 19, 2017

(54) ELECTRIC DRIVE-TRAIN FOR SHIPS

(75) Inventors: Nicholas D. Benavides, Allison Park, PA (US); Nicholas S. Smith, Rugby (GB)

(73) Assignee: GE Energy Power Conversion Technology Limited (GB)

( * ) Notice: Subject to any disclaimer, the term of this patent is extended or adjusted under 35 U.S.C. 154(b) by 573 days.

(21) Appl. No.: 13/234,583

(22) Filed: Sep. 16, 2011

Related U.S. Application Data

(60) Provisional application No. 61/416,359, filed on Nov. 23, 2010.

(51) Int. Cl.
  *B60W 20/00* (2016.01)
  *H02J 3/38* (2006.01)
  *B60L 15/20* (2006.01)

(52) U.S. Cl.
  CPC .............. *B60W 20/00* (2013.01); *B60L 15/20* (2013.01)

(58) Field of Classification Search
  CPC ........................................................ H02J 3/38
  USPC .................................................. 307/9.1, 19
  See application file for complete search history.

(56) References Cited

U.S. PATENT DOCUMENTS

| | | | |
|---|---|---|---|
| 2,163,140 A | 6/1939 | Coleman et al. | |
| 4,007,407 A | 2/1977 | Kranert | |
| 4,114,555 A | 9/1978 | O'Brien, Jr. | |
| 5,199,912 A | 4/1993 | Dade et al. | |
| 5,684,690 A | 11/1997 | Levedahl | |
| 5,816,870 A | 10/1998 | Rubin | |
| 5,961,558 A | 10/1999 | Kvamsdal | |
| 6,175,163 B1 | 1/2001 | Rinaldi et al. | |
| 6,188,139 B1 | 2/2001 | Thaxton et al. | |
| 7,429,201 B2 | 9/2008 | Rzadki et al. | |
| 7,710,081 B2 | 5/2010 | Saban et al. | |
| 7,852,025 B2 | 12/2010 | Crane | |
| 2007/0069583 A1* | 3/2007 | Bourgeau et al. | 307/19 |
| 2007/0293104 A1 | 12/2007 | Sandoy et al. | |
| 2009/0156068 A1 | 6/2009 | Barrett et al. | |
| 2009/0215328 A1* | 8/2009 | Daffey | 440/1 |
| 2010/0284117 A1 | 11/2010 | Crane | |
| 2013/0308351 A1* | 11/2013 | MacLennan | 363/34 |

\* cited by examiner

*Primary Examiner* — Robert Deberadinis
(74) *Attorney, Agent, or Firm* — Wood IP LLC

(57) ABSTRACT

An electric drive-train for a ship includes a first generator having a rotatable shaft structured to be driven by a first prime mover and an output providing a voltage; a second generator having a rotatable shaft structured to be driven by a second prime mover and an output providing a voltage; an electric machine including a rotatable shaft structured to drive a propeller; a first power electronic converter electrically interconnected with the output of the first generator and structured to power the electric machine; and a second power electronic converter electrically interconnected with the output of the second generator and structured to power the electric machine. A support structure replaces a reduction gear box and supports the first generator, the second generator, the electric machine, the first power electronic converter, and the second power electronic converter.

17 Claims, 3 Drawing Sheets

ELECTRIC DRIVE-TRAIN FOR SHIPS

CROSS REFERENCE TO RELATED APPLICATION

This application claims the benefit of U.S. Provisional Patent Application Ser. No. 61/416,359, filed Nov. 23, 2010, entitled "Electric Drive-Train for Turbine Driven Ships", which is incorporated by reference herein.

BACKGROUND

Field

The disclosed concept is generally related to electric drive-trains for ships and, more particularly, to electric drive-trains that can replace mechanical drive-train systems utilizing a main reduction gear ("MRG").

Background Information

A prior art mechanical drive-train system is shown in FIG. 1. This particular system includes two gas turbines 1, 2, which are mechanically connected to the MRG 3 or mechanical gearbox, which then mechanically drives a main shaft 4 and a propeller 5.

The use of electric drive-trains for marine propulsion has become very widespread, and is widely considered to be the future of naval propulsion. This enables the electrical load and the propulsion load to share a common power source, and thereby optimizes fuel efficiency as well as increases the available electrical power.

Existing marine vessels and other ships have space constraints and fixed hull-forms. Hence, retrofitting a mechanical drive-train with an electric drive-train is subject to multiple physical constraints.

Typically, integrated power systems (IPSs) have been relegated to a relatively larger class of marine vessel or ship. This is in large part due to auxiliary equipment, such as switchgear and cooling systems, required to support the relatively large power of the propulsion load. In relatively small marine vessels, a hybrid solution is often proposed which involves coupling a relatively smaller rated electrical machine to an existing gear box in order to provide some of the benefit of the IPS without adding a full set of equipment.

SUMMARY

These needs and others are met by embodiments of the disclosed concept, which provide an electric drive-train for a ship in a support structure structured to replace a reduction gear box.

As one aspect of the disclosed concept, an electric drive-train for a ship comprises: a first generator including a rotatable shaft structured to be driven by a first prime mover and an output providing a voltage; a second generator including a rotatable shaft structured to be driven by a second prime mover and an output providing a voltage; an electric machine comprising a rotatable shaft structured to drive a propeller; a first power electronic converter electrically interconnected with the output of the first generator and structured to power the electric machine; a second power electronic converter electrically interconnected with the output of the second generator and structured to power the electric machine; and a support structure structured to replace a reduction gear box, the support structure supporting the first generator, the second generator, the electric machine, the first power electronic converter and the second power electronic converter.

As another aspect of the disclosed concept, an electric drive-train for a ship comprises: a generator including a rotatable shaft structured to be driven by a prime mover and an output providing a voltage; an electric machine comprising a rotatable shaft structured to drive a propeller; a power electronic converter electrically interconnected with the output of the generator and structured to power the electric machine; and a support structure structured to replace a reduction gear box, the support structure supporting the generator, the electric machine and the power electronic converter.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "ship" means a seagoing vessel, a marine vessel, a motor driven boat, or a nuclear submarine.

As employed herein, the term "prime mover" means a turbine (e.g., without limitation, a gas turbine; a steam turbine); a diesel engine; an internal combustion engine; and a machine that transforms energy from thermal, electrical or pressure form to mechanical form.

As employed herein, the term "power electronic converter" means an electronic switching circuit or an electronic commutator that converts one type of electrical energy (e.g., alternating current (AC) or direct current (DC)) to another voltage and/or frequency. An example of an electronic commutator is disclosed in U.S. Pat. No. 7,852,025, which is incorporated by reference herein.

As employed herein, the term "support structure" means a housing; an enclosure; an underlying structure that gives shape and/or strength to a number of other components; or an open or partially open case or other structure, with or without an outer casing surface, that admits, encloses or supports a number of other components. Non-limiting examples of such components include a number of generators, an electric machine, a number of power electronic converters, a number of rectifiers, a number of cooling systems, and/or a number of electronic circuits.

Figure 1:
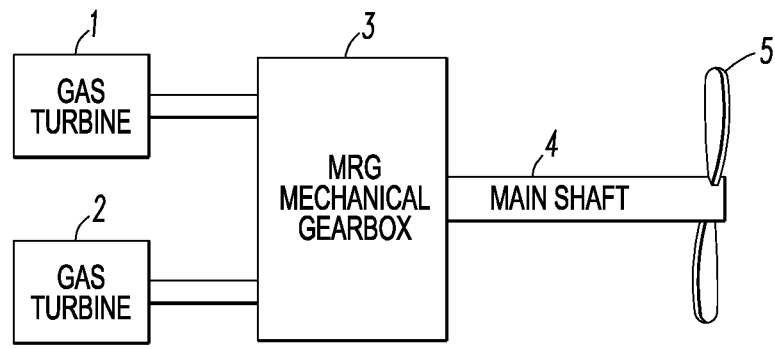
FIG. 1 is a block diagram of a mechanical drive-train.
Figure 2:
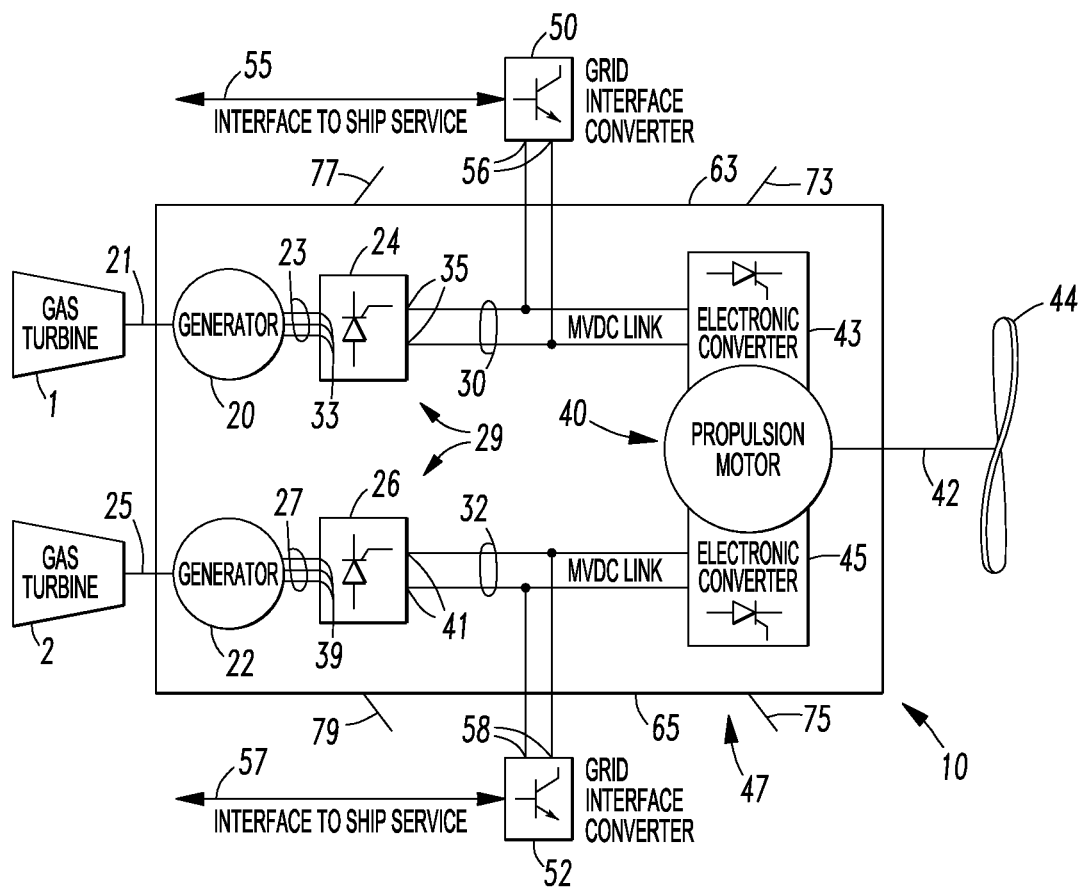
FIG. 2 is a block diagram of an integrated electronic gear box in accordance with embodiments of the disclosed concept.

An embodiment of the disclosed concept is shown in FIG. 2. In this example, the MRG 3 of FIG. 1 is replaced by an integrated electronic gear box shown generally as reference character 10 connected to the prime movers, such as the example gas turbines 1, 2. The integrated electronic gear box 10 includes two high-speed generators, such as the example AC generators 20, 22. Those AC generators 20, 22 are connected to respective rectifiers 24, 26 which are connected by internal medium voltage direct current (MVDC) links 30, 32 to the respective power electronic converters 43, 45 for a propulsion motor 40 which drives shaft 42 and propeller 44.

The example integrated electronic gear box 10 is a replacement for mechanical gear boxes, such as MRG 3 (FIG. 1), on ships (not shown). For example, the turbines 1, 2 are connected to the respective high-speed electrical generators 20, 22, and the shaft 42 is driven by a low-speed direct drive electric machine, such as the example propulsion motor 40. The electrical system of the integrated electronic gear box 10 is integrated into a single component that fits an existing gear box location (not shown) of a ship.

The example generator 20 includes a rotatable shaft 21 structured to be driven by the turbine 1 and an output 23 (e.g., without limitation, three-phase) providing an alternating current voltage. The example generator 22 includes a rotatable shaft 25 structured to be driven by the turbine 2 and an output 27 (e.g., without limitation, three-phase) providing an alternating current voltage.

In the example of FIG. 2, a power electronics circuit 29 includes the first rectifier 24 having an input 33 electrically connected to the output 23 of the generator 20 and an output 35 providing a direct current voltage. The second rectifier 26 of the power electronics circuit 29 includes an input 39 electrically connected to the output 27 of the generator 22 and an output 41 providing a direct current voltage.

Also, in this example, the propulsion motor 40 includes the rotatable shaft 42 structured to drive the propeller 44. The first power electronic converter 43 is electrically connected to the output 35 of the first rectifier 24 and is structured to power the propulsion motor 40, and the second power electronic converter 45 is electrically connected to the output 41 of the second rectifier 26 and is structured to power the propulsion motor 40.

A support structure, such as an example housing 47 (FIG. 3A) of the example integrated electronic gear box 10, is structured to replace a reduction gear box. The example housing 47 supports or houses the generators 20, 22, the power electronics circuit 29, and the propulsion motor 40. For example, the housing 47 includes a first opening 49 for the rotatable shaft 21 of the generator 20, a second opening 51 for the rotatable shaft 25 of the generator 22, and a third opening 53 for the rotatable shaft 42 of the propulsion motor 40. In this example, at least a portion of the rotatable shaft 21 of the example first generator 20, the rotatable shaft 25 of the example second generator 22 and the rotatable shaft 42 of the example propulsion motor 40 are external to the example housing 47. Although the example openings 49, 51, 53 are shown on the same side of the housing 47 in FIGS. 3A and 3B, one or two of these openings could alternatively be located on the opposite side of the housing 47 as shown in FIG. 2.

The high-speed generators 20, 22 can be, for example, direct current (DC), alternating current (AC), active stator, permanent magnet, or traditional synchronous generators.

The low-speed direct drive electric machine, such as the example propulsion motor 40, can be an induction motor, can employ active stator technology, and/or can have a wound synchronous rotor, permanent magnet, or high-temperature super conductor windings.

Connected to each example MVDC link 30, 32 of FIG. 2 at a corresponding input 56, 58 is a grid interface converter 50, 52 that interfaces at a corresponding output 55, 57 to a ship service function (not shown). The grid interface converters 50, 52 are external to the example housing 47 and are preferably coupled thereto. This enables the customer to interface to relatively many different grid types and grid power levels by having different variants of the grid interface converters 50, 52, without requiring major modification or technology development. The example integrated electronic gear box 10 permits that decision to be independent of the main propulsion electronics, thereby greatly reducing the technological hurdles of that decision.

The elimination of the mechanical gear box, and therefore any mechanical link between the gas turbines 1, 2 and the propeller shaft 42, brings multiple benefits. No clutches are required in order to allow split-plant operation or propulsion derived from auxiliary electrical generators, and the transition modes become seamless. Additionally, there is a degree of freedom between gas turbine speed and shaft speed, enabling better optimization of turbine speed. In fact, there is even more freedom in choosing turbine speeds than for an AC IPS marine vessel, as the gas turbine speed is no longer linked to the electrical supply frequency. When compared to a geared hybrid solution, there are several other benefits. The MRG efficiency is relatively very high when operated at full power, but when propulsion is derived from auxiliary electrical generators with a geared hybrid solution, the entire gear train, including the high speed pinion, is turned.

A significant benefit of the disclosed concept is the independence of the ship service networks (not shown) that interface at 55, 57 and the internal MVDC links 30, 32. The capability of bidirectional power transfer is limited only by the power rating of the grid interface converters 50, 52 and the ship service networks to which they connect. The capability to operate in propulsion derived ship service ("PDSS") mode no longer requires a minimum shaft speed, and a suitable interface box can suit any ship service network or full system network solution, regardless of voltage or distribution network.

Integration of the example integrated electronic gear box 10 into existing hull forms employs minimal external hardware. The medium-voltage switchgear required for a full-IPS (Integrated Power System) is a major contributor to overall volume. The integrated electronic gear box 10 employs the example internal MVDC links 30, 32, with semiconductor current limiting (not shown) to protect the generators 20, 22. The integrated electronic gear box 10 may be fitted with a secondary form of circuit protection in the event of multiple concurrent failures, but these would not be the first line of fault mitigation. This eliminates the need for any external switchgear at full current rating between the generators 20, 22 and the main propulsion load of the shaft 42 and the propeller 44. An external switchgear (not shown) is employed at the ship service network interfaces at 55, 57, but the size and rating of this switchgear depends on the desired electrical power take-off rating and the rating of the interface hardware. The integrated electronic gear box 10 has port side 63 and starboard side 65 variable voltage DC takeoff points capable of, for example and without limitation, up to 18 MW, depending on the rating of the corresponding grid interface converter ("GIC") 50, 52. The GIC 50, 52 can limit the fault current available at the ship service network, thereby reducing arc-flash severity.

Figure 3A:
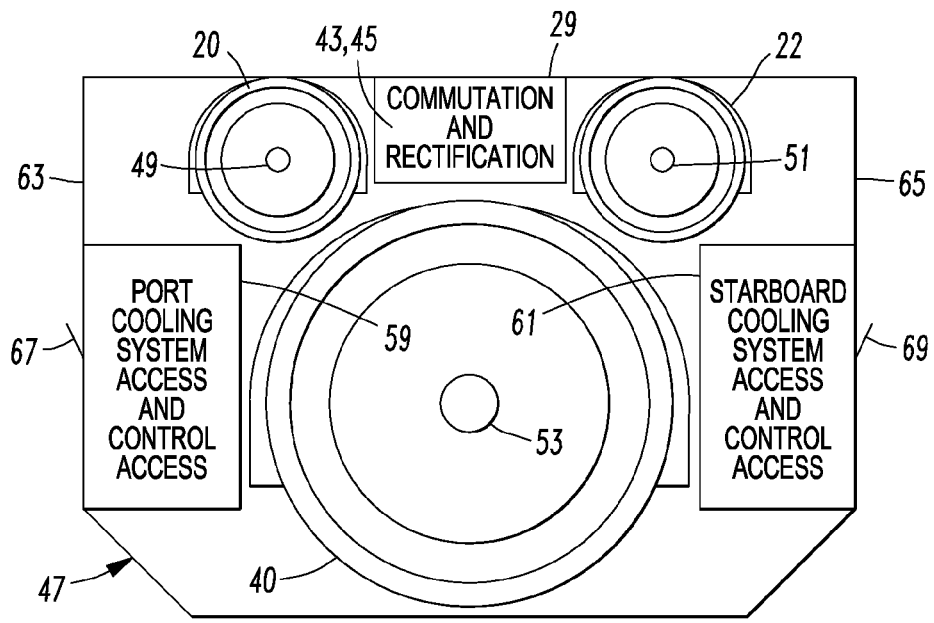
FIG. 3A is an end vertical elevation view of one configuration of the integrated electronic gear box of FIG. 2.
Figure 3B:
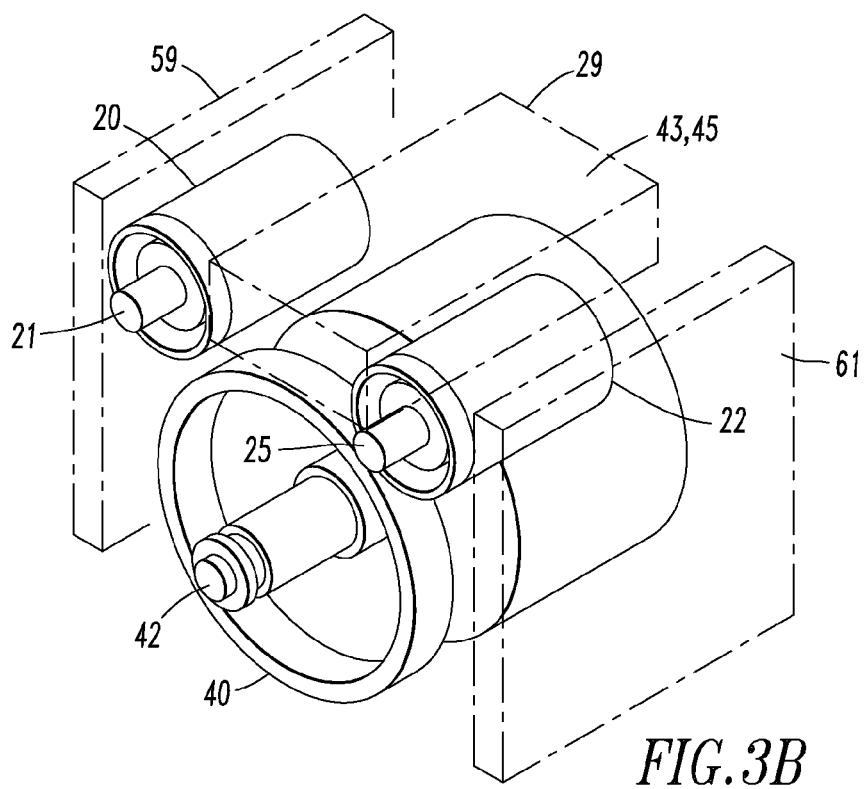
FIG. 3B is an isometric view of the integrated electronic gear box of FIG. 3A with the support structure removed to show internal structures.

The example integrated electronic gear box 10 employs a tightly-integrated liquid cooling system 59, 61 to maximize power density, as is shown in FIGS. 3A and 3B. Preferably, low-toxicity, low-flammability, synthetic mineral oil cooling is employed for the stators (not shown) and the commutation electronics, such as the example power electronic converters 43, 45 (FIG. 2) that are included with the example power electronics circuit 29 (FIGS. 3A and 3B). The electronics packaging is structured for complete oil immersion, although other liquid coolants, such as de-ionized (reverse-osmosis) water, may be employed. The high-speed machines 20, 22 directly coupled to the main turbines 1, 2 (FIG. 2) can be used to force air through any elements not utilizing oil cooling. A small electric vent fan (not shown) could be used for some modes of operation. Rotating oil seals are preferably minimized within the integrated electronic gear box 10, and any number of separate air loops being totally enclosed in order to provide fire segregation.

The example cooling systems 59, 61 are employed with several redundant features to maximize survivability and allow graceful degradation due to damage.

The propulsion shaft 42 is driven by the example direct drive propulsion motor 40 utilizing active stator technology, which employs two independent, interleaved winding sets to increase survivability and split the power between the two gas turbines 1, 2 and the independent electrical power take-offs. This provides, for example and without limitation, a power rating of 36 MW mechanical power into the shaft 42 at 150 RPM. The propulsion motor 40 utilizes an integrated electronic commutator circuit with very high power density. The low frequency switching of this commutator circuit leads to very quiet and energy-efficient operation. This commutator circuit is preferably accessible for service and repair.

The example generators 20, 22 are integrated into the envelope of the example housing 47 for the integrated electronic gear box 10, utilizing either synchronous or permanent magnet high-speed technology. Alternatively, DC or induction generators can be employed. For example and without limitation, the base power output is 20 MW at 4000 RPM. The output of these generators 20, 22 is directly rectified onto the internal MVDC links 30, 32. This provides independent control of the turbine speed and shaft speed for optimization of fuel economy. As another example, the RPMs of the generators 20, 22 can be different and, since there is no mechanical linkage to the propulsion motor 40, the RPMs of the generators 20, 22 are independent of the RPM of the propulsion motor 40.

The integrated electronic gear box 10 can interface with any grid technology or configuration. The grid configuration impacts only the interface converters 50,52, which are either DC-AC or DC-DC. If interfacing to a traditional low-voltage network, galvanic isolation is employed for safety. The power density and size of the converters 50, 52 depend on the power requirements of the mode of operation. If the converters 50, 52 and the connected distribution system are structured for full generation capacity, then this system resembles a classical IPS, except that propulsion power does not necessarily pass through the converters.

Due to the highly integrated nature of the example integrated electronic gear box 10, survivability and logistical support are preferably included. Access is preferably provided to repair and replace electronic components. Machine reparability can be provided by employing suitable bearing housings and end plates. The integrated electronic gear box 10 preferably includes separately accessible port and starboard oil circulation systems with bypass allowances. The electronic control is preferably separated into port and starboard systems within each assembly of the integrated electronic gear box 10 with separate access panels, such as panels 67, 69 for the respective cooling systems 59, 61 (FIG. 3A), panels 73, 75 for the respective power electronic converters 43, 45 (FIG. 2), or panels 77, 79 for the respective rectifiers 24, 26 (FIG. 2).

To enhance survivability, the integrated electronic gear box 10 preferably eliminates single points of failure. The lube-oil, electronics, and coolant systems are structured such that a major failure leaves half of the unit unaffected. Additionally, the integrated electronic gear box 10 has a much lower part count than existing IPS solutions.

Alternatively, the cooling can be a combination of air, water, and oil cooling loops.

Although two turbines 1, 2 and two generators 20, 22 have been described in connection with FIG. 2, a single turbine 1 and a single generator 20 can be employed.

Figure 4:
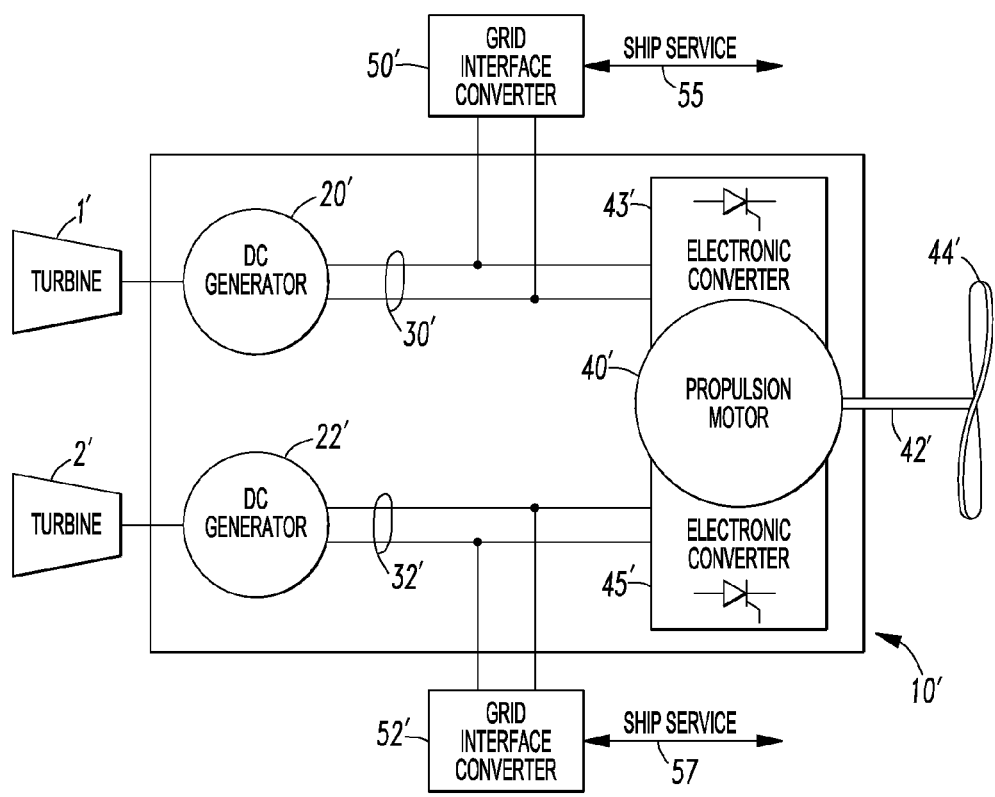
FIG. 4 is a block diagram of an integrated electronic gear box in accordance with another embodiment of the disclosed concept.

Another embodiment of the disclosed concept is shown in FIG. 4. In this example, the MRG 3 of FIG. 1 is replaced by an integrated electronic gear box shown generally as reference character 10' connected to prime movers, such as the example gas turbines 1', 2'. The integrated electronic gear box 10' includes high-speed generators, such as DC generators 20', 22'. The DC generators 20', 22' are connected to the respective power electronic converters 43', 45' that are structured to power a propulsion motor 40' which drives shaft 42' and propeller 44'. It will be appreciated that a same or similar support structure, such as the example housing 47 of FIGS. 2 and 3A, can be employed for the example integrated electronic gear box 10'.

Although two turbines 1', 2' and two generators 20', 22' have been described in connection with FIG. 4, a single turbine 1' and a single generator 20' can be employed.

Although not shown in FIG. 2, other intermediate components can be employed between the rectifiers 24, 26 and the respective power electronic converters 43, 45, and/or between the internal MVDC links 30, 32 and the respective grid interface converters 50, 52, and/or between the power electronic converters 43, 45 and the propulsion motor 40.

Similarly, although not shown in FIG. 4, other intermediate components can be employed between the generators 20', 22' and the respective power electronic converters 43', 45', and/or between the internal MVDC links 30', 32' and the respective grid interface converters 50', 52', and/or between the power electronic converters 43', 45' and the propulsion motor 40', such as for example and without limitation, reactors, filters, common-mode chokes and/or other passive filtering elements.

The example integrated electronic gear boxes 10, 10' are advantageously applied to ship propulsion systems, preferably where the size of the ship (e.g., without limitation, frigates; traditional sized destroyers) is small relative to the drive-train power. This provides a compact fully integrated solution when dealing with space constraints or fixed hull-forms.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electric drive-train for a ship, said electric drive-train comprising: a first generator including a rotatable shaft structured to be driven by a first prime mover and an output providing a voltage;

a second generator including a rotatable shaft structured to be driven by a second prime mover and an output providing a voltage;

an electric machine comprising a rotatable shaft structured to drive a propeller;
a first power electronic converter electrically interconnected with the output of said first generator and structured to power said electric machine;
a second power electronic converter electrically interconnected with the output of said second generator and structured to power said electric machine; and
a support structure structured to replace a reduction gear box, said support structure supporting said first generator, said second generator, said electric machine, said first power electronic converter and said second power electronic converter;
wherein said first and second generators are structured to rotate at a first rounds per minute; and
wherein said electric machine is structured to rotate at a second rounds per minute which is substantially less than said first rounds per minute.

2. The electric drive-train of claim 1 wherein said first generator is a first alternating current generator; wherein said second generator is a second alternating current generator; wherein said support structure also supports a first rectifier including an input electrically interconnected with the output of said first alternating current generator and an output providing a direct current voltage, and a second rectifier including an input electrically interconnected with the output of said second alternating current generator and an output providing a direct current voltage; wherein the first power electronic converter is electrically interconnected with the output of said first rectifier; and wherein the second power electronic converter is electrically interconnected with the output of said second rectifier.

3. The electric drive-train of claim 2 wherein the first power electronic converter is electrically interconnected with the output of said first rectifier by a medium voltage direct current bus; and wherein the second power electronic converter is electrically interconnected with the output of said second rectifier by a medium voltage direct current bus.

4. The electric drive-train of claim 2 wherein said support structure includes a first port side and an opposite starboard side; wherein the first port side of said support structure includes a first access panel for the first rectifier; and wherein the second starboard side of said support structure includes a second access panel for the second rectifier.

5. The electric drive-train of claim 1 wherein said first generator is a first direct current generator; and wherein said second generator is a second direct current generator.

6. The electric drive-train of claim 1 wherein a first grid interface converter is coupled to said support structure and includes an input electrically interconnected with the output of said first generator and an output structured to power a ship service function; and wherein a second grid interface converter is coupled to said support structure and includes an input electrically interconnected with the output of said second generator and an output structured to power a ship service function.

7. The electric drive-train of claim 6 wherein said support structure includes a first port side and an opposite starboard side; wherein said first grid interface converter is coupled to said support structure at the first port side; and wherein said second grid interface converter is coupled to said support structure at the second starboard side.

8. The electric drive-train of claim 1 wherein said support structure includes a first port side and an opposite starboard side; wherein a first liquid cooling system is supported by said support structure proximate the first port side; wherein a second liquid cooling system is supported by said support structure proximate the second starboard side; and wherein said electric machine is supported by said support structure between said first liquid cooling system and said second liquid cooling system.

9. The electric drive-train of claim 8 wherein the first port side of said support structure includes a first access panel for the first liquid cooling system; and wherein the second starboard side of said support structure includes a second access panel for the second liquid cooling system.

10. The electric drive-train of claim 1 wherein said support structure includes a first port side and an opposite starboard side; wherein the first port side of said support structure includes a first access panel for the first power electronic converter; and wherein the second starboard side of said support structure includes a second access panel for the second power electronic converter.

11. The electric drive-train of claim 1 wherein a first liquid cooling system and a second liquid cooling system are supported by said support structure; wherein said first liquid cooling system is structured to cool said first power electronic converter; and wherein said second liquid cooling system is structured to cool said second power electronic converter.

12. The electric drive-train of claim 11 wherein said first and second liquid cooling systems employ mineral oil or deionized water as a liquid coolant.

13. The electric drive-train of claim 1 wherein at least a portion of the rotatable shaft of said first generator, the rotatable shaft of said second generator and the rotatable shaft of said electric machine are external to said support structure.

14. An electric drive-train for a ship, said electric drive-train comprising:
a generator including a rotatable shaft structured to be driven by a prime mover and an output providing a voltage;
an electric machine comprising a rotatable shaft structured to drive a propeller;
a power electronic converter electrically interconnected with the output of said generator and structured to power said electric machine; and
a support structure structured to replace a reduction gear box, said support structure supporting said generator, said electric machine and said power electronic converter;
wherein said generator is structured to rotate at a first rounds per minute; and
wherein said electric machine is structured to rotate at a second rounds per minute which is substantially less than said first rounds per minute.

15. The electric drive-train of claim 14 wherein at least a portion of the rotatable shaft of said generator and the rotatable shaft of said electric machine are external to said support structure.

16. An electric drive-train for a ship, said electric drive-train comprising:
a generator including a rotatable shaft structured to be driven by a prime mover and an output providing a voltage;
an electric machine comprising a rotatable shaft structured to drive a propeller;
a power electronic converter electrically interconnected with the output of said generator and structured to power said electric machine; and a support structure structured to replace a reduction gear box, said support structure supporting said generator, said electric machine and said power electronic converter;

wherein at least a portion of the rotatable shaft of said generator and the rotatable shaft of said electric machine are external to said support structure.

17. An electric drive-train for a ship, said electric drive-train comprising: a first generator including a rotatable shaft structured to be driven by a first prime mover and an output providing a voltage;

a second generator including a rotatable shaft structured to be driven by a second prime mover and an output providing a voltage;

an electric machine comprising a rotatable shaft structured to drive a propeller;

a first power electronic converter electrically interconnected with the output of said first generator and structured to power said electric machine;

a second power electronic converter electrically interconnected with the output of said second generator and structured to power said electric machine; and a support structure structured to replace a reduction gear box, said support structure supporting said first generator, said second generator, said electric machine, said first power electronic converter and said second power electronic converter;

wherein at least a portion of the rotatable shaft of said first generator, the rotatable shaft of said second generator and the rotatable shaft of said electric machine are external to said support structure.

* * * * *